(12) United States Patent
Bird et al.

(10) Patent No.: US 8,620,922 B2
(45) Date of Patent: *Dec. 31, 2013

(54) GENERATING A TAXONOMY FOR DOCUMENTS FROM TAG DATA

(75) Inventors: Colin Leonard Bird, Winchester (GB); Timothy David Catt, London (GB); Thomas Alan Clabon, Winchester (GB); David John Gordon Robert Rankine, London (GB); James Edwin Jerome Thompson, Winchester (GB); Cerys Willoughby, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/436,374

(22) Filed: Mar. 30, 2012

(65) Prior Publication Data

US 2012/0191718 A1    Jul. 26, 2012

Related U.S. Application Data

(63) Continuation of application No. 12/781,755, filed on May 17, 2010, now Pat. No. 8,346,776.

(51) Int. Cl.
  *G06F 7/00*  (2006.01)
  *G06F 17/30*  (2006.01)
(52) U.S. Cl.
  USPC .......................................................... 707/740

(58) Field of Classification Search
  None
  See application file for complete search history.

(56) References Cited

U.S. PATENT DOCUMENTS

| | | |
|---|---|---|
| 2009/0287674 A1 | 11/2009 | Bouillet et al. |
| 2011/0082825 A1 | 4/2011 | Sathish et al. |
| 2011/0125760 A1 | 5/2011 | Frieden et al. |

OTHER PUBLICATIONS

United States Patent and Trademark Office, Notice of Allowance for U.S. Appl. No. 12/781,755, Aug. 20, 2012, pp. 1-7, Alexandria, VA, USA.
United States Patent and Trademark Office, Office Action for U.S. Appl. No. 12/781,755, Apr. 25, 2012, pp. 1-11, Alexandria, VA, USA.

*Primary Examiner* — Uyen Le
(74) *Attorney, Agent, or Firm* — Lee Law, PLLC; Christopher B. Lee (57) ABSTRACT

A method and system for generating a taxonomy for documents from tag data are provided. The method includes obtaining tag data in the form of tags on documents with tag weightings for a document and clustering the tags using the tag weightings for documents, wherein each cluster is an identified subject. The documents are associated with each identified subject and the subjects are compared to identifying relationships between subjects to build a taxonomy of subjects. A tag weighting for a document is the number of times the tag is applied to the document with a user rating of the relevance of the tag to the document. The steps are carried out automatically without user intervention.

13 Claims, 9 Drawing Sheets

GENERATING A TAXONOMY FOR DOCUMENTS FROM TAG DATA

RELATED APPLICATIONS

This application is a continuation of and claims priority to and claims the benefit of U.S. patent application Ser. No. 12/781,755 titled "GENERATING A TAXONOMY FOR DOCUMENTS FROM TAG DATA," which issued as U.S. Pat. No. 8,346,776 on Jan. 1, 2013, which was filed in the United States Patent and Trademark Office on May 17, 2010, and which is incorporated herein by reference in its entirety.

BACKGROUND

This invention relates to the field of tagging of documents with folksonomies. In particular, the invention relates to using tag data to generate a taxonomy for documents from tag data.

As the number of resources of information available in all formats grows at an increasing rate, retrievability of useful information becomes an ever more significant issue. In the vast majority of cases the information that the user requires exists, but the user has difficulty retrieving the required information.

Content-based search is an imprecise method, so owners of information content look for ways to organize their information to facilitate retrieval by subject. A common solution to this problem is the use of classification methods. Classification can be formal, based on a controlled vocabulary, usually a taxonomy; or it can be informal and evolve as the result of social tagging. Although practitioners often refer to the potential for synergy between the two approaches, practical suggestions for combining the two vocabularies are very rare.

A taxonomy provides a consistent and unambiguous structure, whereas social tagging enables users to choose terms that have meaning for them. The collection of tags is commonly known as a folksonomy. Comparing the two approaches, a taxonomy has formal controlled keywords in a hierarchy, whereas a folksonomy is a flat namespace built by the end-users choosing words which have meaning to them. Therein lies the difficulty: to exploit the synergy, an effective translation between the two models must be found.

The formal taxonomy approach has advantages for precise retrieval; however, there are a number of problems in practice. It is a manual process that is time consuming and requires subject matter experts to classify documents using a pre-defined rigid vocabulary. This vocabulary must be agreed in advance, but is then inflexible, and change can only occur over a long period of time because of the need to agree the new taxonomy, or requires migration for those affected by the change. One problem with a formal taxonomy is that the vocabulary is decided by the content owners, and may not match the vocabulary of the content user community. Documents may be classified using terms different from those that users employ, thus hindering retrieval.

As an example, a content owner may classify the content using scientific terminology for example using the Latin species names:
*Canis lupus*
*Castor canadensis*
*Felis rufus*
*Microsorex hoyi*
*Taxidea taxus*
*Ursus arctos*
*Vulpes vulpes*

However, the users of the content may not be familiar with the chosen classification, and instead use the following common names:
Grey wolf
Beaver
Bobcat
Pygmy shrew
Badger
Grizzly bear
Red fox A folksonomy has the advantage of being both dynamic and using the language of the community of content users. Tags are in a sense self-defining in the context of the community of users. The ability to be able to determine the relationship between tags on content provides a number of opportunities for both presenting the content using a structure that is meaningful for the user community, and also making any formal structure of the information more relevant based on the feedback of the user community through the use of social tags.

Manual assessment of tags may be made to create a basic taxonomy. A domain expert may take the list of tags and decide which are most generic, and which are more specific, and then organise these headings in a way which is logical to the subject matter expert to create a taxonomy. If different people (or even the same person at different times) creates the taxonomy in this manner, they would end up with different results.

Scaling any manual system to large numbers of content or social tags such as are found in an information centre or a content hosting website such as Flickr (Flickr is a trade mark of Yahoo Inc.) is not viable. A large website or information set could easily generate over 10,000 tags, and having subject matter experts individually deciding whether it is generic or specific, and assigning their relationships is unfeasible. As theAs method is ad hoc, there would be no consistency between the decisions that the experts used to make their decisions, so splitting the work would be unreliable.

An expert's intervention also misses the primary value of the tags in providing information about the users understanding of the information, because it takes no account of community knowledge or preferences. The subject matter expert is deciding how the tags and therefore information is related, rather than using the collective knowledge and preferences of the community, by analysing how the tags added by users are related.

Manual taxonomy creation also risks breaking the link between the tags and the documents. The emerging vocabulary of user community tags derives from both the information itself and the community that uses it.

BRIEF SUMMARY

According to a first aspect of the present invention there is provided a method for generating a taxonomy for documents from tag data, comprising: obtaining tag data in the form of tags on documents with tag weightings for a document; clustering the tags using the tag weightings for documents, wherein each cluster is an identified subject; associating the documents with each identified subject; comparing the subjects and identifying relationships between subjects; and building a taxonomy of subjects using the relationships between subjects; wherein the steps are carried out automatically without user intervention.

According to a second aspect of the present invention there is provided a computer software product for generating a taxonomy for documents from tag data, the product comprising a computer-readable storage medium, storing a computer in which program comprising computer-executable instructions are stored, which instructions, when read executed by a computer, perform the following steps: obtain tag data in the form of tags on documents with tag weightings for a document; cluster the tags using the tag weightings for documents, wherein each cluster is an identified subject; associate the documents with each identified subject using the relationships between subjects; compare the subjects and identifying relationships between subjects; and build a taxonomy of subjects; wherein the steps are carried out automatically without user intervention.

According to a third aspect of the present invention there is provided a system for generating a taxonomy for documents from tag data, comprising: a processor; a tag data collector for obtaining tag data in the form of tags on documents with tag weightings for a document; a subject identifying component for clustering the tags using the tag weightings for documents, wherein each cluster is an identified subject; an associating component for associating the documents with each identified subject; a subject relating component for comparing the subjects and identifying relationships between subjects; and a taxonomy constructing component for building a taxonomy of subjects using the relationships between subjects; wherein the components operate automatically without user intervention.

The subject matter regarded as the invention is particularly pointed out and distinctly claimed in the concluding portion of the specification.

BRIEF DESCRIPTION OF THE SEVERAL VIEWS OF THE DRAWINGS

Preferred embodiments of the present invention will now be described, by way of example only, and with reference to the following drawings.

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The solution to the problems described above is to programmatically identify a structure within a folksonomy that can be determined from the information content and the folksonomy without the need for intervention from a domain expert.

The solution disclosed describes how a structure can be inferred from social tags without the need for domain knowledge, and without analysing the content of the information. The method uses both the relative importance of tags, based on the number of times a tag is added to a document, and the rating of that tag as assessed by the users. The method also uses their context-dependent relationships, using analysis of tag-to-content and tag-to-tag, to identify the structure for the taxonomy. This use of the tags, data and rating of tags together has the following advantages:

No domain knowledge is required;
The results are repeatable and not arbitrary;
The structure produced is dynamic as the folksonomy changes over time;
The solution is capable of being scaled to tens of thousands of documents and thousands of tags;
The information structure represents a relationship between the tags and content as perceived by the user community;
The information structure represents the preferences of the user community, and not the opinions of the subject matter expert or content owner.

This structure can then be used to present the information content in a more meaningful way for the users, or it can be used to generate a dynamic vocabulary that enables users to choose from subject areas that have been identified both formally and collaboratively. Users would see categories, with the lists of terms in those categories deriving from a merger of the taxonomy and the folksonomy.

Information content has tags added to it by the user community. A tag has both importance and relevance assigned to it, by the number of times that the tag is used on a topic, and by the rating given to the tag. A tag that is only rarely used on a document, or that receives a number of negative ratings can be assumed to be less important and less relevant, but a tag that is used many times and receives positive ratings can be assumed to be important and significant.

In a taxonomy hierarchy, the higher-level subject terms are more generic and will be used to classify a wider range of documents. Accordingly, the correlation between subject level and tag importance is likely to be very strong. Documents that share a subject are likely to be identifiable from sharing a set of key tags and those shared tags having a relatively high importance on those documents.

However, ranking is insufficient to identify structural relationships between tags. To infer structure, the context in which two or more tags are used together must be looked at. Essentially, if users associate two tags with the same document, and those two tags are not synonyms, it can be deduced that those tags are related by context.

The method uses both the relative importance of tags and their context-dependent relationships to identify a structure for the folksonomy.

The following definitions are used in this description.
Subject—conceptual area of knowledge.
Document—associated with one or more subjects, information resource such as an article, image, video, audio, etc.
Tags—labels that are applied to documents by users.
Taxonomy—unambiguous multi-level hierarchy of subjects and associated documents.

Folksonomy—set of tags and their relationships with documents.

Tag's vector—for the n documents, this is a list of n numbers where the nth number is the relevance of the tag on the nth document.

Document's vector—similar to a tag's vector but the nth number is the relevance of the nth tag on the document.

Distance between vectors—this could be measured as the distance between the vectors (for example, sum of differences for each element=Manhattan distance=1-norm, square root of sum of squares of all differences=Euclidian distance=2-norm or infinity norm), the angle between the vectors, the correlation between the vectors.

Tag similarity—related to the distance between 2 tags' vectors.

Key tag—one of a number of tags identified as part of a tag cluster that represents a subject.

Extended tag—all of the tags on all of the documents that belong to a subject.

Figure 1:
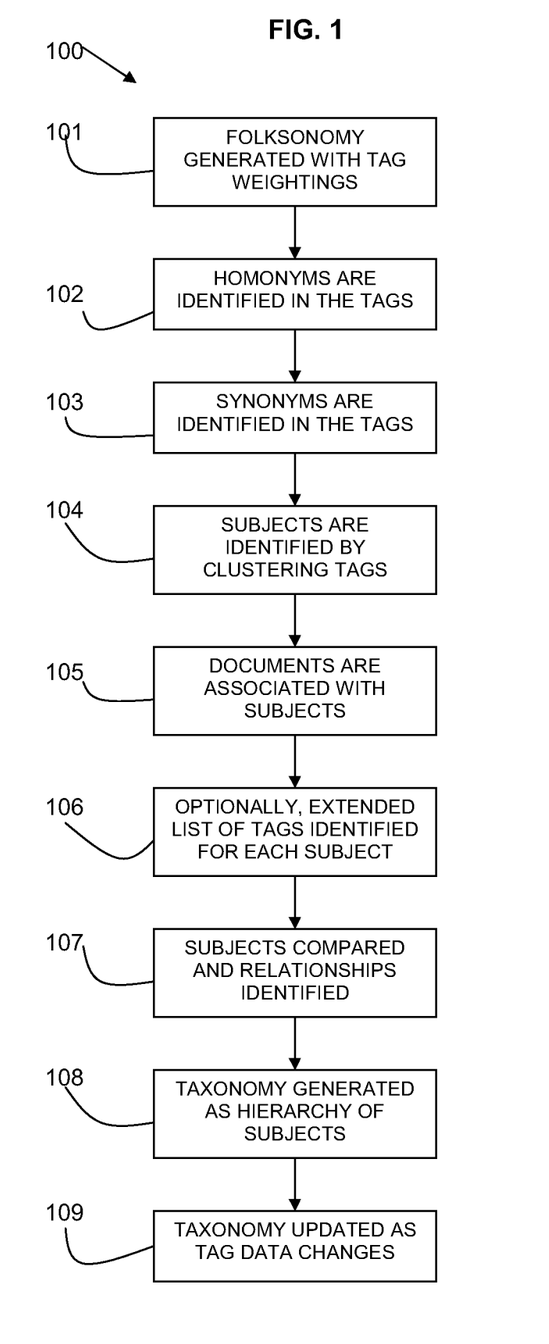
FIG. 1 is a flow diagram of a method in accordance with a preferred embodiment of the present invention.

Referring to FIG. 1, a flow diagram shows a method of constructing a taxonomy from tag data in a folksonomy. A folksonomy is generated 101 by allowing users to tag documents and tag data is obtained. A tag weighting is obtained from a number of times the tag is applied to a document. In one embodiment, the weighting is derived from users are able to express opinions on the relevance of tags added by other users using a rating mechanic that allows both positive and negative relevance.

A snapshot is taken of a database that stores all of the data about which tags have been put on which documents and how many votes each tag-topic pair has. The tag-document pairs are analysed in the described method to output a taxonomy for the documents.

Homonyms (words that share the same spelling and/or the same pronunciation but have different meanings) are identified 102 in the tags. Synonyms are also identified 103 in the tags.

Subjects are identified 104 by processing the tags using a non-overlapping clustering technique using tag similarity to identify subjects. Each cluster of tags identified is a subject.

The documents are associated 105 with subjects based on the relevance of each of the tags in the subject on each of the subjects. Optionally, an extended list of tags is identified 106 for each subject.

Each pair of subjects is compared 107 to determine relationships between subjects. This may be by using the extended list of tags for each pair of subjects to compare and identify which subjects are related and children/parents of each other based on the presence or absence of key tags in the others extended tag list. Another method of comparing subjects 107 is to compare the documents associated with each subject.

Using this information, a hierarchy of subjects is constructed 108. The documents are ordered in the taxonomy. As a folksonomy is always changing as users add more tags, a snapshot of a folksonomy is taken at a given time to generate the taxonomy and may be regularly updated 109.

Figure 2:
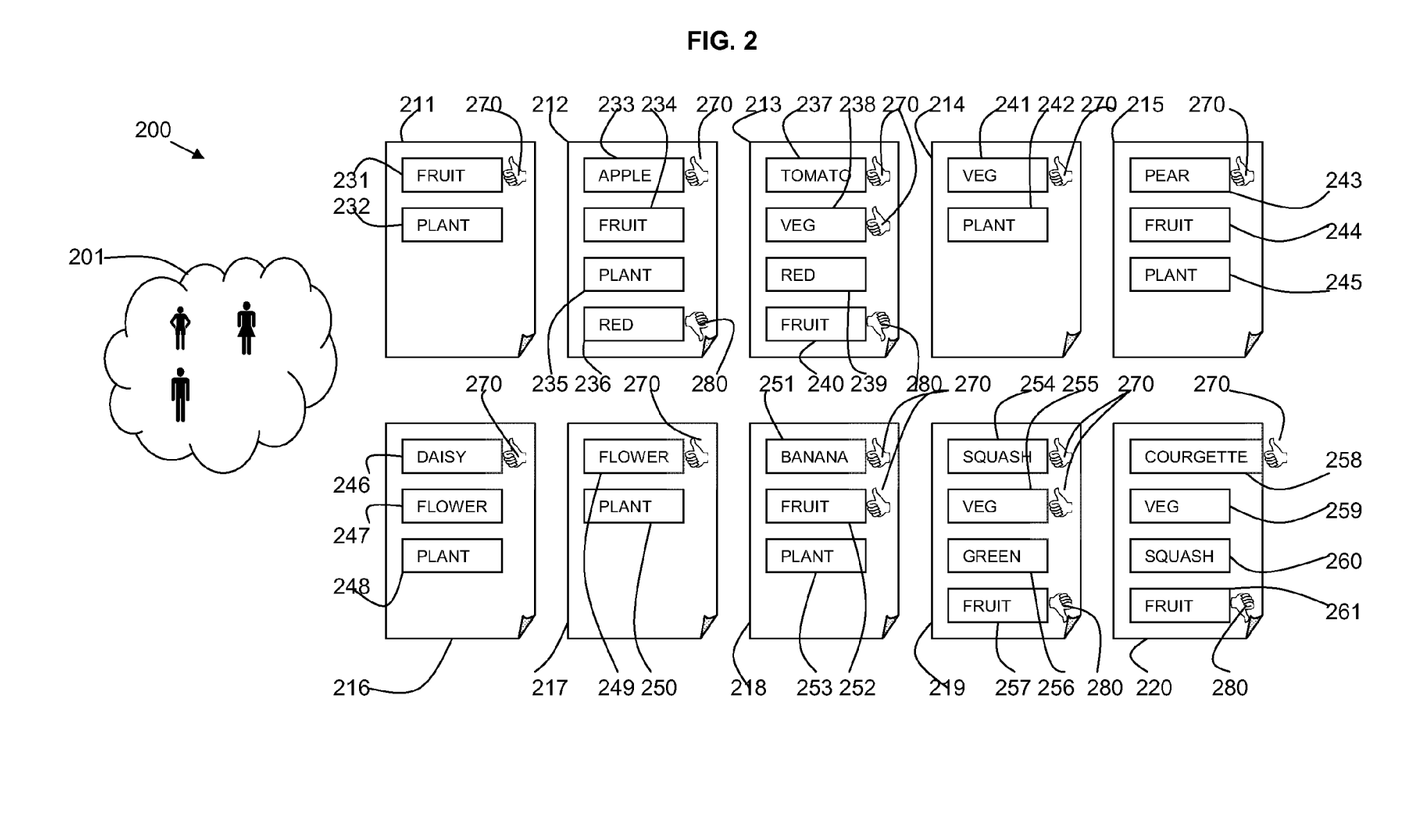
FIG. 2 is a schematic diagram of a folksonomy in accordance with a preferred embodiment of the present invention.

The above method is now described in more detail. A folksonomy is generated in the described method and system by allowing users to tag documents and express opinions on the relevance of tags added by other users using a rating mechanic that allows both positive and negative relevance. This is illustrated in FIG. 2 which shows a folksonomy 200 created by a user community 201 tagging documents 211-220 with tags 231-261. In one embodiment, a tag 231-261 can have a tag rating which may be positive or negative. In this example, the tag rating is a simple good 270 or bad 280 rating. More complex rating systems may be used. For each document 211-220, a tag can have a weighting based on the number of times the tag is used and on the user tag rating.

In one embodiment, a user voting for a tag on a document or adding the tag to the document increases that tag's popularity by one. A user can also vote against a tag on a document to decrease its popularity by one. This popularity measure is unique for each tag on each object and a tag can have different popularities on different documents. This allows the opinions of all users to be taken into account.

The described method allows a tag to be not relevant (i.e. not present or badly rated), very relevant (present and highly rated) or any point in-between. For example, a document about "football" would be tagged with "football" and this tag would be highly rated. It might also be tagged with "soccer" which is a correct tag for the document, but "football" may be considered to be better. The tag "soccer" should not be removed from the document as its presence is useful, but the tag "football" is considered more useful and that distinction can be made using the rating. Also, if someone inadvertently tagged the document with something irrelevant such as "carrot", the tag is now present and voting allows the relevance to be reduced without an administrator having to go through and manually assess tags.

In the described method, tags are treated as objects, for example, "tomato" is a tag object with ID=1234. Relationships are defined between the objects. For example, if two tag objects are attached to similar content objects with similar weights on each one, then they are probably synonyms. If object 1 always occurs with object 2, but object 2 also occurs without object 1, then object 2 is probably more general, etc. By treating tags as objects, there is no need to consider their meaning. There is no need to refer to other resources such as WordNet (WordNet is a trade mark of The Trustees of Princeton University) to obtain definitions of the tags. If the word used in a tag was defined by WordNet, the given definition and relationships for it may not fit with what the users understand the word to mean. Therefore, by using WordNet or similar resources, a taxonomy would be constructed that is not as usable for the users. By using the described tag analysis, tags can be included that other resources would not be able to include. The users' interpretations of a tag word are considered, instead of a predefined definition.

Figure 3A:
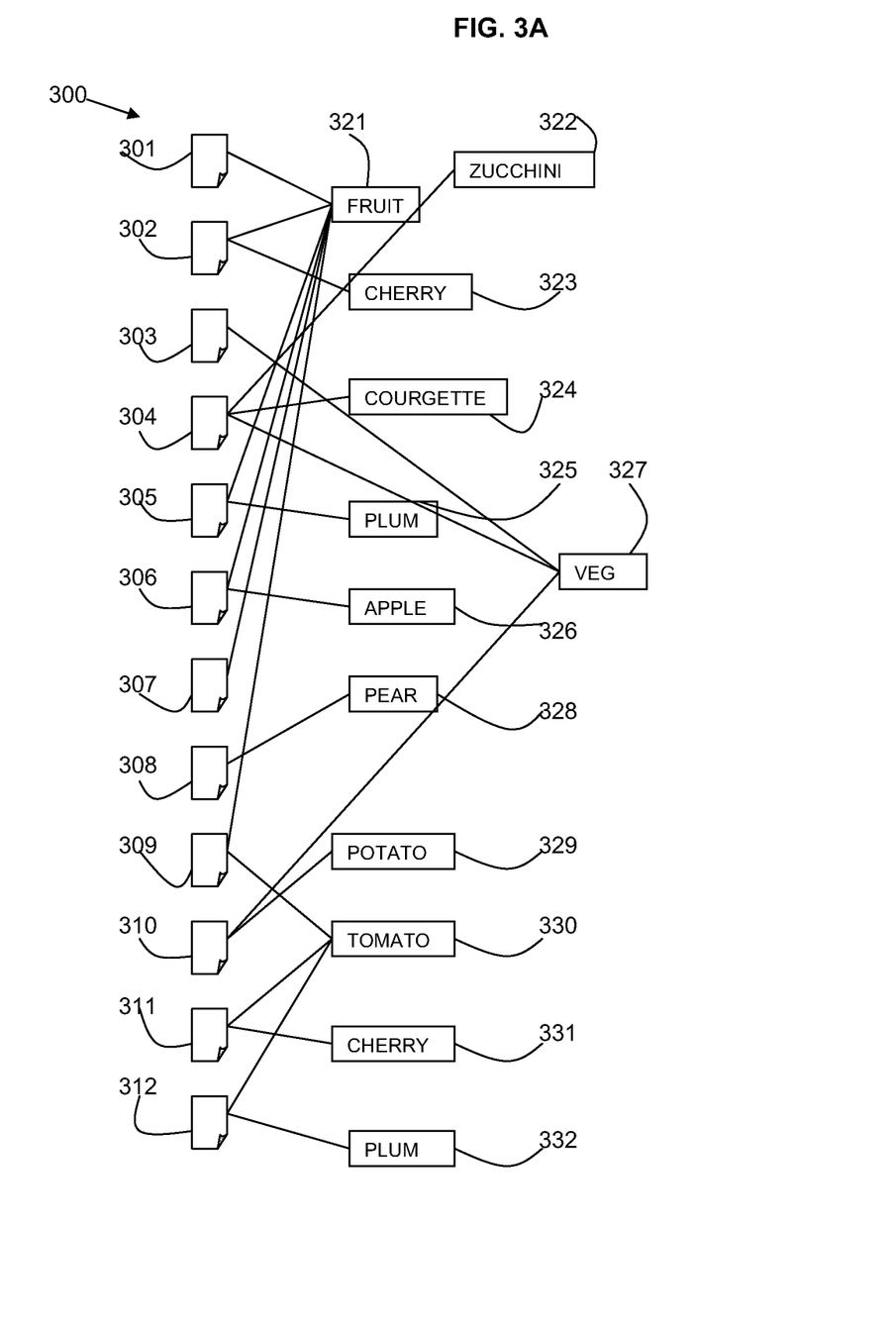
FIGS. 3A to 3D are schematic diagrams showing an example of tagged documents in accordance with a preferred embodiment of the present invention.

FIG. 3A shows an example folksonomy 300 showing documents 301-312 with tags 321-332 applied in the form of labels, in this case of fruit and vegetables as used in the example below.

Homonyms are identified as follows:

For each tag, find the list of documents that it is relevant for.

For each of those documents find how similar it is to the others based on the other tags on those documents.

If there are two or more distinct sets of similar documents then the tag in the first step is a homonym.

N instances of the homonym are created, one for each set of similar documents.

For each set of similar documents you replace the tag with the one of the n new tags that is for that group. This results in multiple versions of the same tag, one for each of the different contexts within which it is used.

Finding how similar the documents are may be, for example, by using clustering where the distance between documents is the distance (or angle) between their respective vectors. In another example, a graph may be created with documents as nodes and edges as similarity and using a minimum-cut algorithm. If the cut is less than a predefined threshold then the tag is a homonym—this is repeated for each version of the tag.

Figure 3B:
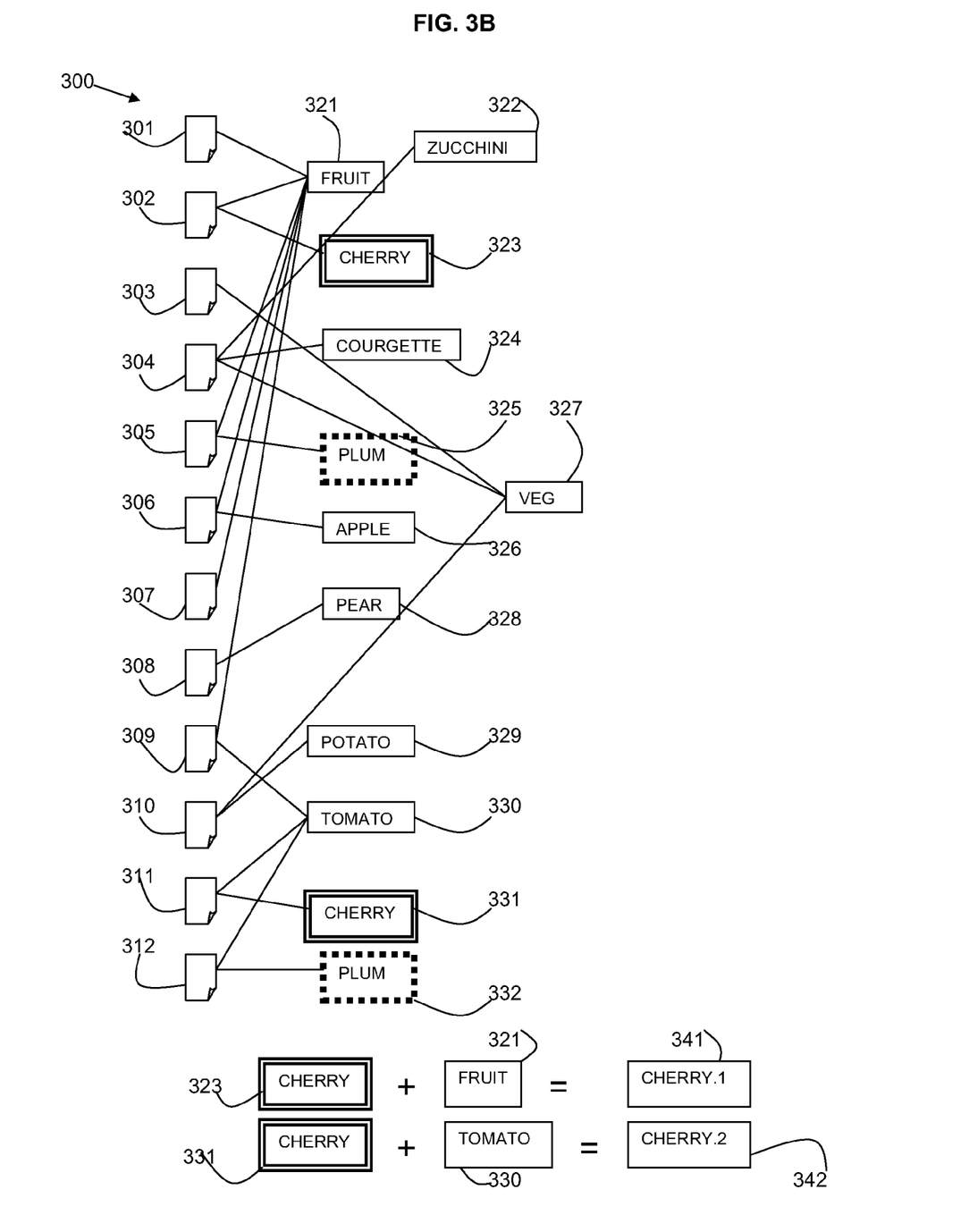
Figure 3C:
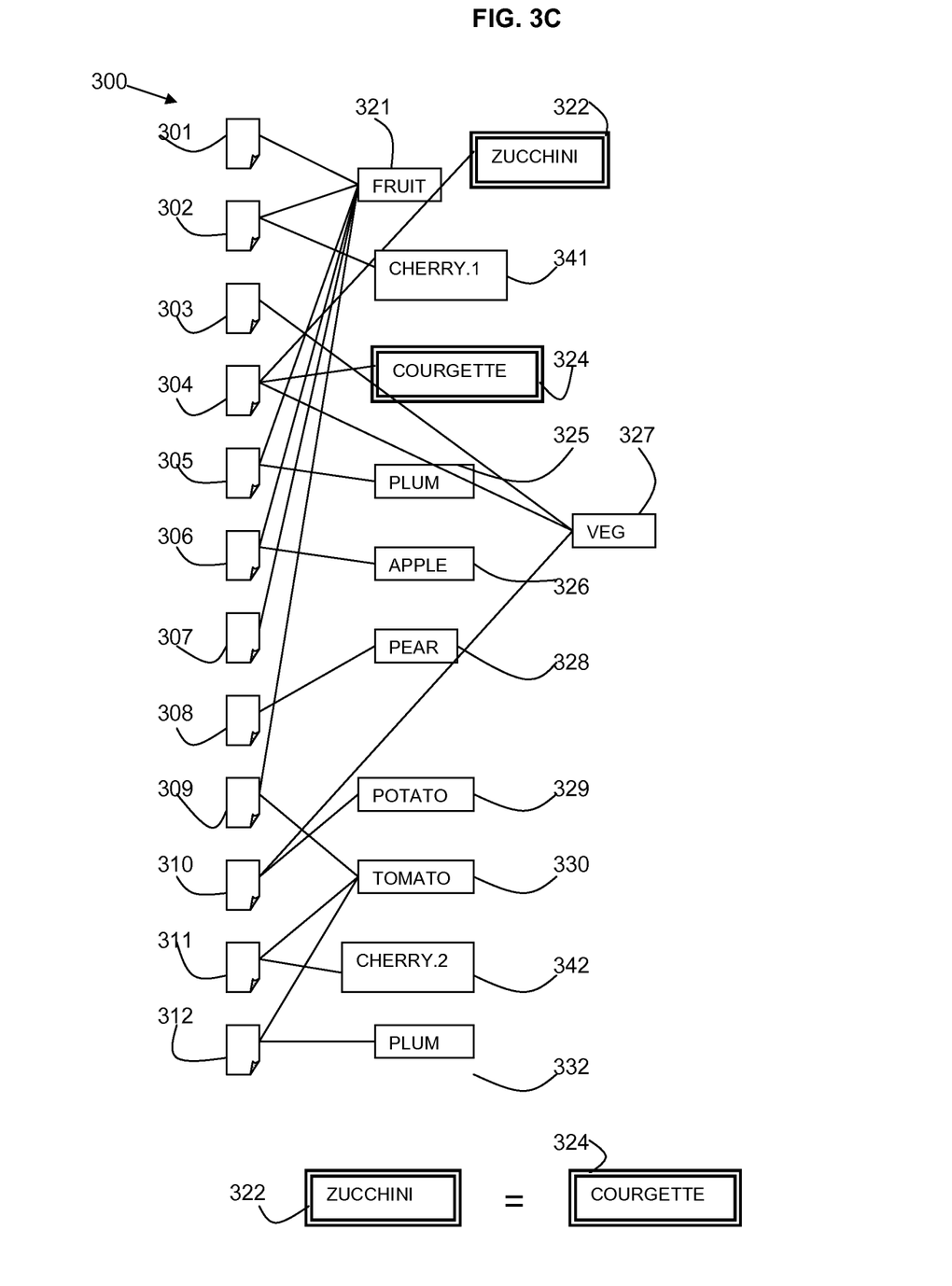

FIG. 3B shows the folksonomy of FIG. 3A with homonyms shown. The first tag "Cherry" 323 and the second tag "Cherry" 331 are homonyms as one is also tagged with "Fruit" 321 and one is also tagged with "Tomato" 330. A cherry may be a pipped fruit or may be a type of tomato. Therefore, two versions of the tag "Cherry" are needed, a first "Cherry.1" 341 for the fruit and a second "Cherry.2" 342 for the tomato. FIG. 3C shows the tags for "Cherry" 323, 331 replaced by the tags for "Cherry.1" 341 and "Cherry.2" 342. The same also applies to the tag "Plum" 325, 332 which may be a fruit or a tomato.

Synonyms are identified as follows:

For each tag identify other tags that occur on the same documents that it is applied to with similar weights (and therefore similar relevance), where the difference in weights is less than a predefined threshold. This could be done by comparing each tags' vector's distance or correlation, etc.

This identifies those tags that are synonyms (including any homonyms previously identified). For example, the tag "woods" may have been previously identified as a homonym (e.g. woodland, golf clubs) and then its use in the context of woodland may be identified as a synonym for the tag "forest".

Each tag can be made into a tag set with just itself in it, and then synonym tag sets can be joined into one tag set. Tag sets can be clustered into subjects and this gives the same result with sets that allow differentiation between what are similar tags, and tags that are synonyms.

FIG. 3C shows the folksonomy of FIG. 3A with synonyms shown. The tags "Zucchini" 322 and "Courgette" 324 are synonyms and have the same or similar tag weightings on the same topic.

Subjects are identified by processing the tags using a non-overlapping clustering technique using tag similarity and co-occurrence to identify subjects. Each cluster of tags identified is a subject. These tags then become the "key tags" for this subject.

The aim is to group together (cluster) similar tags, such that each group represents a subject such as would be defined if creating a controlled vocabulary from domain knowledge. However, for this stage, no such knowledge is required and dictionary definitions are not used. Therefore, the subjects can accommodate terms that are not even in a dictionary.

In one example embodiment, each tag is associated with 1 . . . n of the documents that comprise the information set of n documents. Those associations are represented by a vector of length n, each element i being the weight of the tag for document i. The weight of the tag for a document being a combination of the number of instances of the tag being applied to a document and the positive/negative rating(s) of the tag in the document. The correlation between a pair of such tag-vectors measures similarity of the tags. That correlation might, for example be measured as the cosine of the angle between the vectors, so a value close to 1 indicates high similarity. In this example embodiment, in a first clustering step pair-wise correlations are used to cluster tags into subjects; thereafter, once two tags are clustered, their cluster is then compared pair-wise.

The clustering technique should be a hierarchical one as flat methods require the number of clusters to be known in advance and in the described method the number of subjects is not known in advance. Different hierarchical methods include, agglomerative (bottom up), divisive (top-down), or incremental.

All methods should produce the same dendrogram which is a tree diagram representing the hierarchy of clusters. The dendrogram is cut or pruned to produce the final clusters. Different methods of cutting include constant height, or more mathematical based methods that try and maximise intra-cluster similarity (similarity of elements within a cluster) and inter-cluster dissimilarity (the distance between clusters). In clustering, it is necessary to measure the distance between clusters. There are different methods of doing this including: the minimum distance between two elements; maximum distance; average pair-wise distance; and distance between average points.

Documents are associated with subjects which is a precursor to extracting the subject structure. This association is based on the relevance of each of the "key tags" in the subject on each of the documents. For example, for each document, the average relevance of the key tags is calculated for a subject. If above a predefined threshold then the document is associated with the subject. When assigning documents to subjects, one document may belong to multiple subjects.

In one embodiment, this stage of associating documents with subjects aggregates the former tag associations. For each of the n documents, the tags associated with it are known and it is known which tags comprise each subject. The correlation between the tag vectors for a document and a subject are used to determine whether a subject is associated with that document. If the association is made, an average weight is calculated from the weights of the tags comprising the subject. The outcome of this correlation exercise is effectively a new vector set, in which each element of the vector equals the weight of the subject for document i (where i=1 . . . n).

Figure 3D:
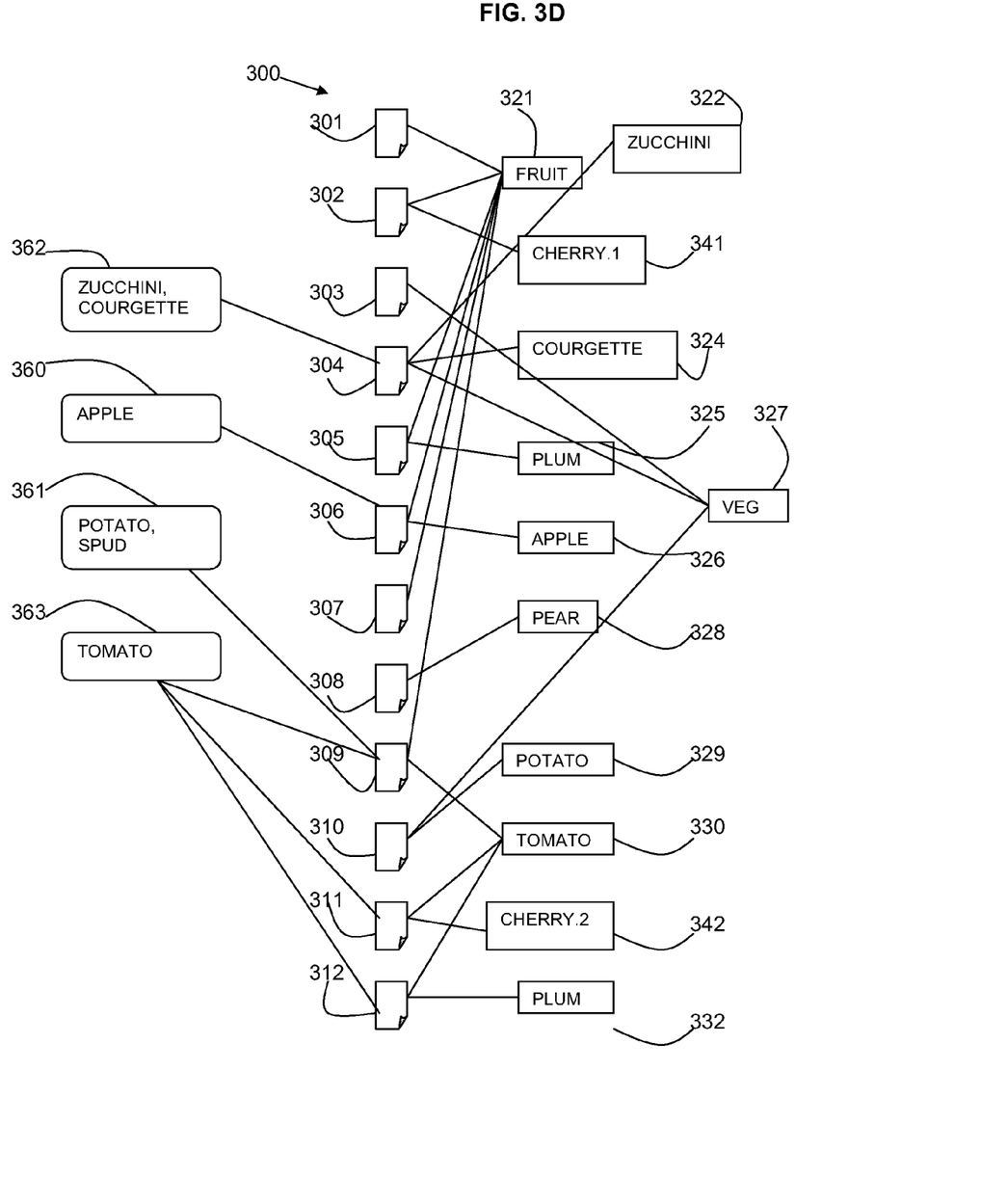

Referring to FIG. 3D, the folksonomy 300 shows four subjects as follows: "Apple" 360, "Potato, Spud" 361, "Zucchini, Courgette" 362, and "Tomato" 363. Any document 301-312 that has the subject's tags with high weight is about that subject.

An extended list of tags can be identified for each subject. For each subject, the list of tags is combined for each of the documents associated with the subject. Each tag in the extended list is given a relevance which is the average relevance on all of the topics in the subject.

For example, in FIG. 3D, the key tag for a subject 363 is "Tomato". The extended list of tags is 1/3 "Fruit"+1/3 "Cherry.2"+1/3 "Plum"+3/3 "Tomato".

The relationships between subjects is then considered. In one embodiment, the extended list of tags is compared for each pair of subjects, to identify which subjects are related and children/parents of each other based on the presence or absence of one subject's key tags in the extended tag list of the other subject.

For example, if Subject1 and Subject2 have a similar set of extended tags (e.g. highly correlated tag vectors) then it can be deduced that Subject1 and Subject 2 are related and should be close in the taxonomy. Further to this, if Subject1's extended tags do not include Subject2's key tags but Subject2's extended tags do include Subject1's key tags then it can be deduced that Subject2 is more specific because it has tags unique to itself compared to Subject1. In this way, it can be deduced not only that subjects are close in the taxonomy but build a directed graph of subjects where direction indicates parent-child relationships. Each of these edges can also be given a weight to represent the confidence in this relationship actually existing.

The correlation of extended tags is used to determine if subjects are close in the taxonomy. See the table below:

| Subject | Extended tags |
|---|---|
| Cherry.2 | 1.0 "Cherry.2", 1.0 "Tomato" |
| Zucchini, Courgette | 1.0 "Zucchini", 1.0 "Courgette", 1.0 "Vegetable" |
| Cherry.2 | 1.0 "Cherry.2", 1.0 "Tomato" |
| Tomato | 1.0 "Tomato", 0.33 "Cherry.2", 0.33 "Plum", 0.33 "Fruit" |
| Cherry.2 | 1.0 "Cherry.2", 1.0 "Tomato" |
| Plum | 1.0 "Plum". 1.0 "Tomato" |

In the first row, there is no correlation between the extended tags of (1.0 "Cherry.2" and 1.0 "Tomato") and the extended tags of (1.0 "Zucchini", 1.0 "Courgette", 1.0 "Vegetable"), so the subjects of "Cherry.2" and "Zucchini, Courgette" are not close.

In the second row, there is correlation between the extended tags of (1.0 "Cherry.2", 1.0 "Tomato") and the extended tags of (1.0 "Tomato", 0.33 "Cherry.2", 0.33 "Plum", 0.33 "Fruit"), so the subjects of "Cherry.2" and "Tomato" are close.

In the third row, there is correlation between the extended tags of (1.0 "Cherry.2", 1.0 "Tomato") and the extended tags of (1.0 "Plum". 1.0 "Tomato"), so the subjects of "Cherry.2" and "Plum" are close.

The weights of one subject's key tags in another's extended tags can be used to determine relationships. For example, in the second row of the table above, the key tag "Cherry.2" has a weight of 0.33 as an extended tag in the subject "Tomato". Whereas, the key tag "Tomato" has a weight of 1.0 as an extended tag in the subject "Cherry.2". As 1.0 is greater than 0.33, it can be deduced that the subject "Tomato" is a parent of "Cherry.2".

As another example, in the third row of the table above, the key tag "Cherry.2" does not exist as an extended tag in the subject "Plum" and therefore has a weight of 0. Similarly, the key tag "Plum" does not exist as an extended tag in the subject "Cherry.2" and therefore has a weight of 0. As these weights are 0, there is no parent-child relationship, but "Cherry.2" and "Plum" may be siblings.

In another embodiment, subject-document associations (weighted by the number of tag associations) are used to relate subjects. So, if a first document has three tags referring to it, it is shown to have a tag association weighting of 3. Consider the complexity of the full network containing every document and every subject, not as an end in itself, but to illustrate the extent of the inter-relationships. Subjects are related to each other through the documents with which they are associated, and the weights of those associations can be used to calculate a likelihood that subject X is a child of subject Y (or vice versa, Y is the parent of X).

Using this information regarding relationships between subjects, a hierarchy of subjects can be generated. This is done by making sure that the graph is actually a tree(s), i.e. there are no circular relationships and each subject only has one parent. This "pruning" can be done most effectively by considering the weights of the edges which is the confidence that the relationship expressed by that edge actually exists.

To convert the subject network into a tree, the method removes all edges between nodes (where each subject is a node) that can be reached by a longer route, removes loops, and removes edges that enable a node to be reached in more than one path. This algorithm attempts to find the best link between two nodes, but can also be used to handle situations where nodes have multiple children. When the method has converted the network to a tree, the resulting structure represents a subject hierarchy based on the folksonomy.

Figure 4:
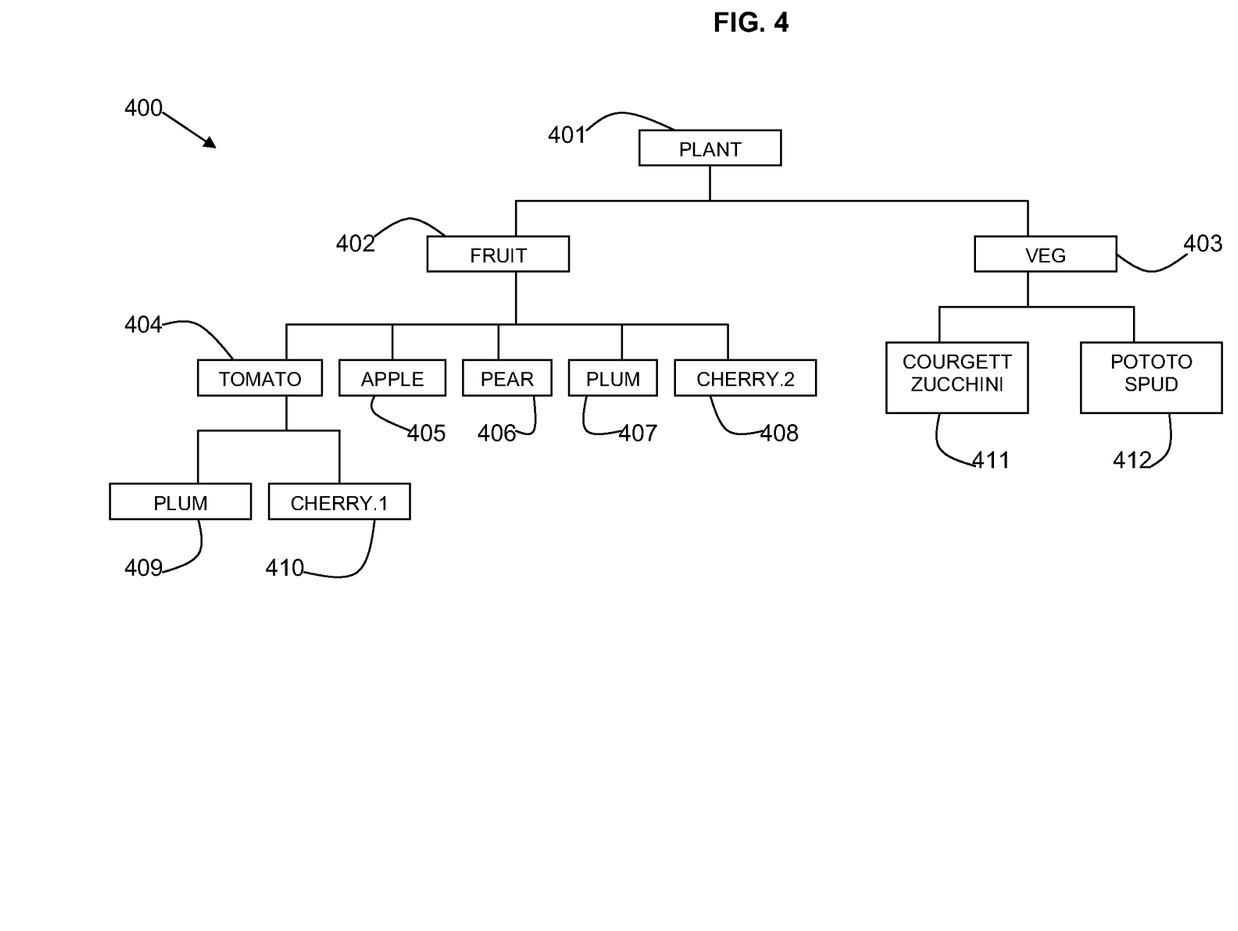
FIG. 4 is a schematic diagram of a taxonomy as generated by a preferred embodiment of the present invention.

These hierarchies of subjects are taxonomies. FIG. 4 shows a taxonomy 400 of the example. A root node of "Plant" 401 has child nodes of "Fruit" 402 and "Vegetables" 403. "Fruit" 402 has child nodes of "Tomato" 404, "Apple" 405, "Pear" 406, "Plum.2" 407, "Cherry.2" 408. "Tomato" 404 has child nodes of "Plum.1" 409 and "Cherry.1" 410. In the vegetable branch, "Vegetables" 403 has child nodes "Courgette/Zucchini" 411 and "Potato/Spud" 412.

Figure 5:
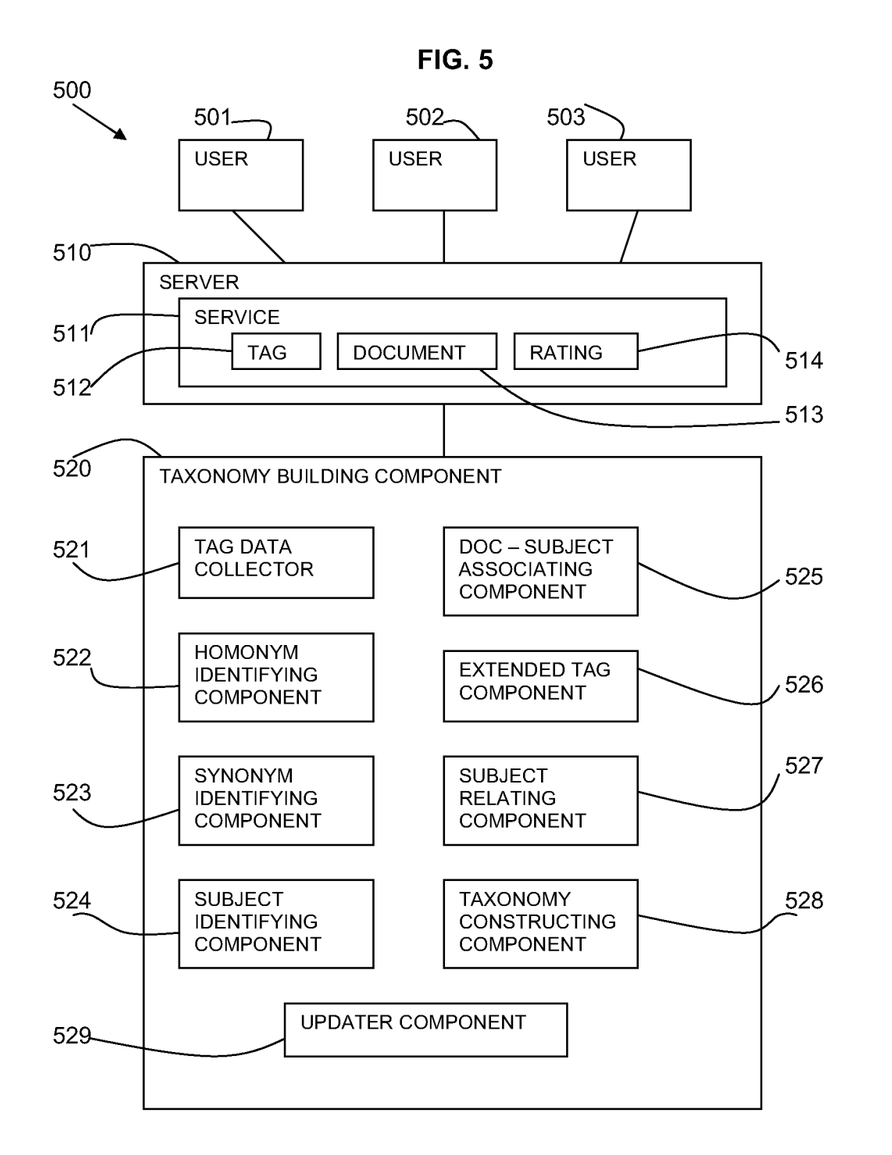
FIG. 5 is a block diagram of a system in accordance with a preferred embodiment of the present invention.

Referring to FIG. 5, a block diagram shows a system 500 for generating a taxonomy for documents from tag data. A web server 510 provides a service 511 in which users 501-503 can apply tags 512 to documents 513 hosted by a server 510. In this way a folksonomy is created in the form of documents 513 with tags 512.

In one embodiment of the described system, the service 511 allows users to provide a rating 514 on their tags and other people's tags. The rating 514 may be positive or negative.

A taxonomy building component 520 is provided which uses the tagging data of the social network service 511 to generate a taxonomy of the documents 513. As a folksonomy is always changing as more tags are added by users, a snapshot of a folksonomy is taken at a given time to generate the taxonomy and may be regularly updated. The taxonomy building component 520 may use tagging data from more than one service 511 and combine the tagging data.

The taxonomy building component 520 includes a tagging data collector 521 including counting a number of tags per document, and collecting the user tag rating information. The taxonomy building component 520 includes a homonym identifying component 522, a synonym identifying component 523, and subject identifying component 524.

An associating component 525 associates documents with subjects. An extended tag component 526 generates a list of extended tags for a document.

A subject relating component 527 relates subjects, and a taxonomy constructing component 528 constructs the taxonomy from the subject relationships and adds the document to the taxonomy by subject. The resulting taxonomy is provided for searching for documents.

As a folksonomy is always changing as users add more tags, a snapshot of a folksonomy is taken at a given time to generate the taxonomy and may be regularly updated. The taxonomy building component 520 includes an updater component 529 for dynamically updating a taxonomy to reflect a snapshot of tag data at a given time.

Figure 6:
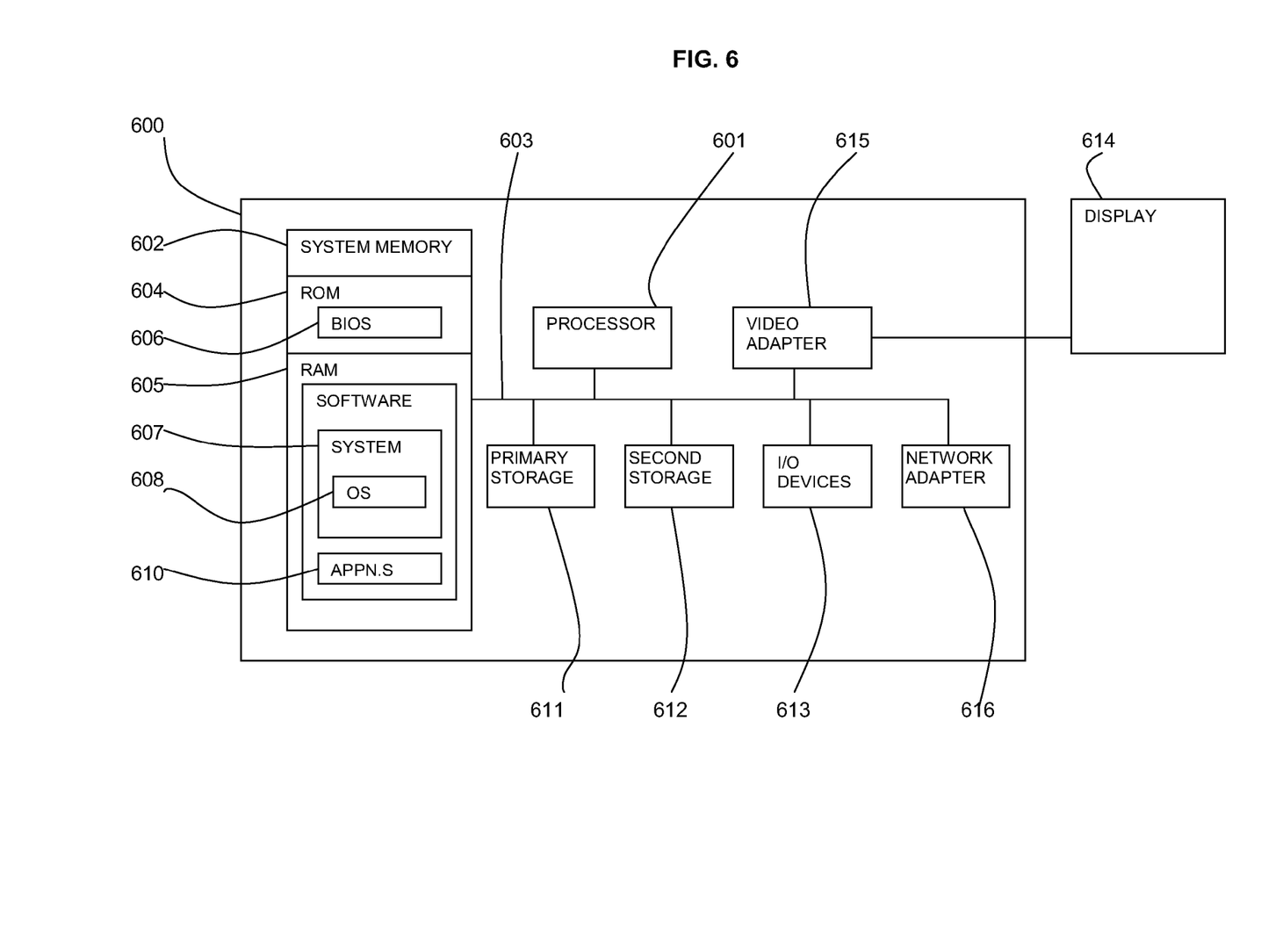
FIG. 6 is a block diagram of a computer system in which a preferred embodiment of the present invention may be implemented.

Referring to FIG. 6, an exemplary system for implementing aspects of the invention includes a data processing system 600 suitable for storing and/or executing program code including at least one processor 601 coupled directly or indirectly to memory elements through a bus system 603. The memory elements can include local memory employed during actual execution of the program code, bulk storage, and cache memories which provide temporary storage of at least some program code in order to reduce the number of times code must be retrieved from bulk storage during execution.

The memory elements may include system memory 602 in the form of read only memory (ROM) 604 and random access memory (RAM) 605. A basic input/output system (BIOS) 606 may be stored in ROM 604. System software 607 may be stored in RAM 605 including operating system software 608. Software applications 610 may also be stored in RAM 605.

The system 600 may also include a primary storage means 611 such as a magnetic hard disk drive and secondary storage means 612 such as a magnetic disc drive and an optical disc drive. The drives and their associated computer-readable media provide non-volatile storage of computer-executable instructions, data structures, program modules and other data for the system 600. Software applications may be stored on the primary and secondary storage means 611, 612 as well as the system memory 602.

The computing system 600 may operate in a networked environment using logical connections to one or more remote computers via a network adapter 616.

Input/output devices 613 can be coupled to the system either directly or through intervening I/O controllers. A user may enter commands and information into the system 600 through input devices such as a keyboard, pointing device, or other input devices (for example, microphone, joy stick, game pad, satellite dish, scanner, or the like). Output devices may include speakers, printers, etc. A display device 614 is also connected to system bus 603 via an interface, such as video adapter 615.

A system for generating a taxonomy for documents from tag data may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for generating a taxonomy for documents from tag data, comprising:
    obtaining tag data in the form of tags on documents with tag weightings for a document;
    clustering the tags using the tag weightings for documents, wherein each cluster is an identified subject;
    associating the documents with each identified subject;
    comparing the subjects and identifying relationships between subjects; and
    building a taxonomy of subjects using the relationships between subjects;
    wherein the obtaining, the clustering, the associating, the comparing, and the building are carried out automatically without user intervention.

2. The method as claimed in claim 1, wherein building a taxonomy is dynamically updated to reflect a snapshot of tag data at a given time.

3. The method as claimed in claim 1, wherein a tag weighting for a document is the number of times the tag is applied to the document.

4. The method as claimed in claim 1, wherein tag weighting for a document includes user ratings of the relevance of the tag to the document.

5. The method as claimed in claim 1, wherein clustering the tags includes cutting an obtained dendrogram to produce clusters.

6. The method as claimed in claim 1, including:
    identifying homonyms in the tags, and replacing homonym tags with different names to provide multiple versions of the same tag, one for each of the different contexts.

7. The method as claimed in claim 1, including:
    identifying synonyms in the tags.

8. The method as claimed in claim 1, wherein associating the documents with each identified subject includes:
    determining the key tags clustered in a subject; and
    determining if the average weighting of the key tags in a document is above a predefined threshold.

9. The method as claimed in claim 1, wherein associating the documents with each identified subject includes:
    correlating tag vectors of a subject and a document.

10. The method as claimed in claim 1, wherein comparing the subjects and identifying relationships between subjects, includes:
    determining the extended tags of a subject as all the tags of documents tagged by a key tag in a subject;
    comparing the extended tags of a pair of subjects.

11. The method as claimed in claim 1, wherein comparing the subjects and identifying relationships between subjects, includes:
    relating subjects to each other through the documents with which they are associated.

12. The method as claimed in claim 1, wherein building a taxonomy of subjects, includes:
    using weights of associations between subjects to determine the likelihood of a relationship.

13. The method as claimed in claim 1, wherein building a taxonomy of subjects, includes:
    providing the subjects as a network of nodes and converting the network into a tree.

* * * * *